US012412441B2

(12) United States Patent
Jackson et al.

(10) Patent No.: US 12,412,441 B2
(45) Date of Patent: Sep. 9, 2025

(54) GAMING SYSTEM AND METHOD WITH A SYMBOL WEIGHTING FEATURE

(71) Applicant: LNW Gaming, Inc., Las Vegas, NV (US)

(72) Inventors: Brett Jackson, Henderson, NV (US); Lucas E. Parkinson, Montreal (CA)

(73) Assignee: LNW Gaming, Inc., Las Vegas, NV (US)

( * ) Notice: Subject to any disclaimer, the term of this patent is extended or adjusted under 35 U.S.C. 154(b) by 250 days.

(21) Appl. No.: 17/732,088

(22) Filed: Apr. 28, 2022

(65) Prior Publication Data

US 2023/0351841 A1 Nov. 2, 2023

(51) Int. Cl.
*G07F 17/34* (2006.01)
*G07F 17/32* (2006.01)

(52) U.S. Cl.
CPC ...... *G07F 17/3213* (2013.01); *G07F 17/3251* (2013.01); *G07F 17/3267* (2013.01)

(58) Field of Classification Search
CPC ... G07F 17/3267; G07F 17/6244; G07F 17/64
See application file for complete search history.

(56) References Cited

U.S. PATENT DOCUMENTS 6,896,617 B2 5/2005 Daly
6,910,962 B2 * 6/2005 Marks ................. G07F 17/3211 463/19
7,252,591 B2 8/2007 Van Asdale
7,591,724 B2 * 9/2009 Baerlocher ......... G07F 17/3267 463/20
7,704,141 B1 4/2010 Marks et al.
8,105,145 B2 1/2012 Jaffe
8,192,272 B2 6/2012 Thomas et al.
8,192,275 B2 6/2012 Aoki et al.
8,303,393 B2 11/2012 Jaffe et al.
10,115,266 B2 10/2018 Shaik
10,733,849 B2 * 8/2020 Marsh ................. G07F 17/3213
2003/0060267 A1 * 3/2003 Glavich .................. G07F 17/32 463/20
2004/0033829 A1 2/2004 Pacey et al.
2009/0069071 A1 3/2009 Aoki et al.
2010/0029364 A1 * 2/2010 Zielinski ............. G07F 17/3244 463/20
2011/0190044 A1 * 8/2011 Berman .............. G07F 17/3265 463/20
2013/0102375 A1 4/2013 Aoki et al.
(Continued)

*Primary Examiner* — Steven J Hylinski

(57) ABSTRACT

There is provided a gaming system and methods that utilize a presentation assembly configured to present a series of spins of a plurality of reels arranged in an array, the array including a subset of the array in which weights are assigned to the symbols within the subset. Determination of winning combinations of the symbols in the array is based, in part, on the weights assigned to the symbols. If any wins occur as the result of a spin, the wins are paid, the winning combinations are removed, and the array shifts to fill in the removed symbols. The subset of the array is randomly repositioned and resized, and weights are added to one or more symbols in the new subset of the array. Any newly resulting wins are paid, and the process repeats until no wins occur, at which point the spin ends.

18 Claims, 23 Drawing Sheets

(56) References Cited

U.S. PATENT DOCUMENTS

| | | | | |
|---|---|---|---|---|
| 2016/0055705 | A1* | 2/2016 | Elias | G07F 17/34<br>463/20 |
| 2016/0328910 | A1* | 11/2016 | Shaik | G07F 17/3244 |
| 2017/0236383 | A1* | 8/2017 | Nakamura | G07F 17/3213<br>463/20 |
| 2018/0033253 | A1* | 2/2018 | Vann | G07F 17/3246 |
| 2018/0130286 | A1* | 5/2018 | Berman | G07F 17/3244 |
| 2018/0130303 | A1* | 5/2018 | Lamb | G07F 17/3213 |
| 2021/0082248 | A1 | 3/2021 | Guerrero | |
| 2021/0104117 | A1 | 4/2021 | Knight et al. | |
| 2022/0335787 | A1* | 10/2022 | Hornik | G07F 17/3267 |

* cited by examiner

GAMING SYSTEM AND METHOD WITH A SYMBOL WEIGHTING FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates to a technological improvement to gaming systems, gaming machines, and methods and, more particularly, to new and improved animations in connection with a feature in which symbols in an array are weighted, the sum of their weights incorporated into the determination of winning combinations of the symbols.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system and methods that utilize a presentation assembly configured to present a series of spins of a plurality of reels arranged in an array, the array including a subset of the array in which weights are assigned to the symbols within the subset. Determination of winning combinations of the symbols in the array is based, in part, on the weights assigned to the symbols. If any wins occur as the result of a spin, the wins are paid, the winning combinations are removed, and the array shifts to fill in the removed symbols. The subset of the array is randomly repositioned and resized, and weights are added to one or more symbols in the new subset of the array. Any newly resulting wins are paid, and the process repeats until no wins occur, at which point the spin ends. Additional aspects of the invention will be apparent to those of ordinary skill in the art in view of the detailed description of various embodiments, which is made with reference to the drawings, a brief description of which is provided below.

Figure 1:
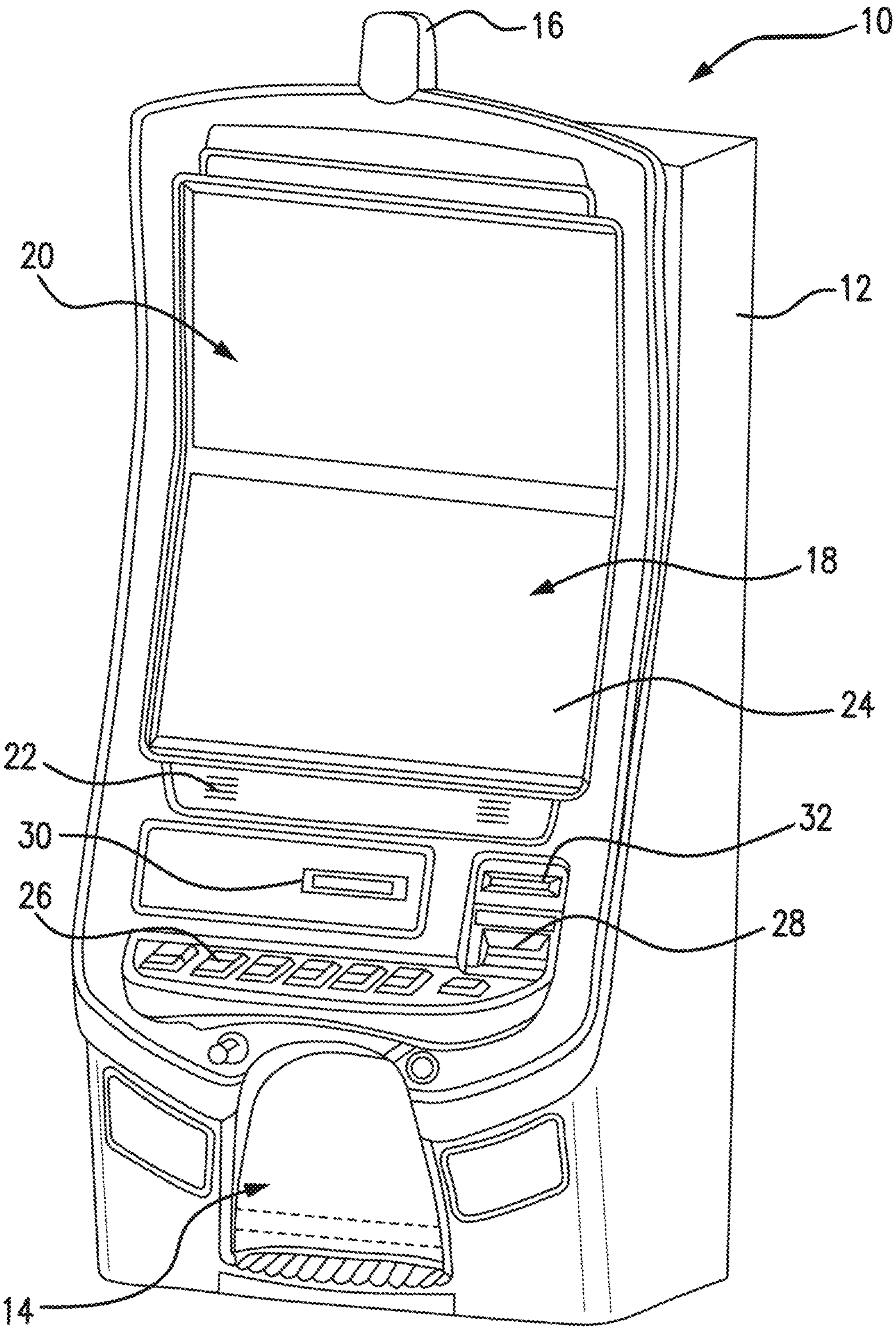
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electro-mechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, email s, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-8). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-8), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
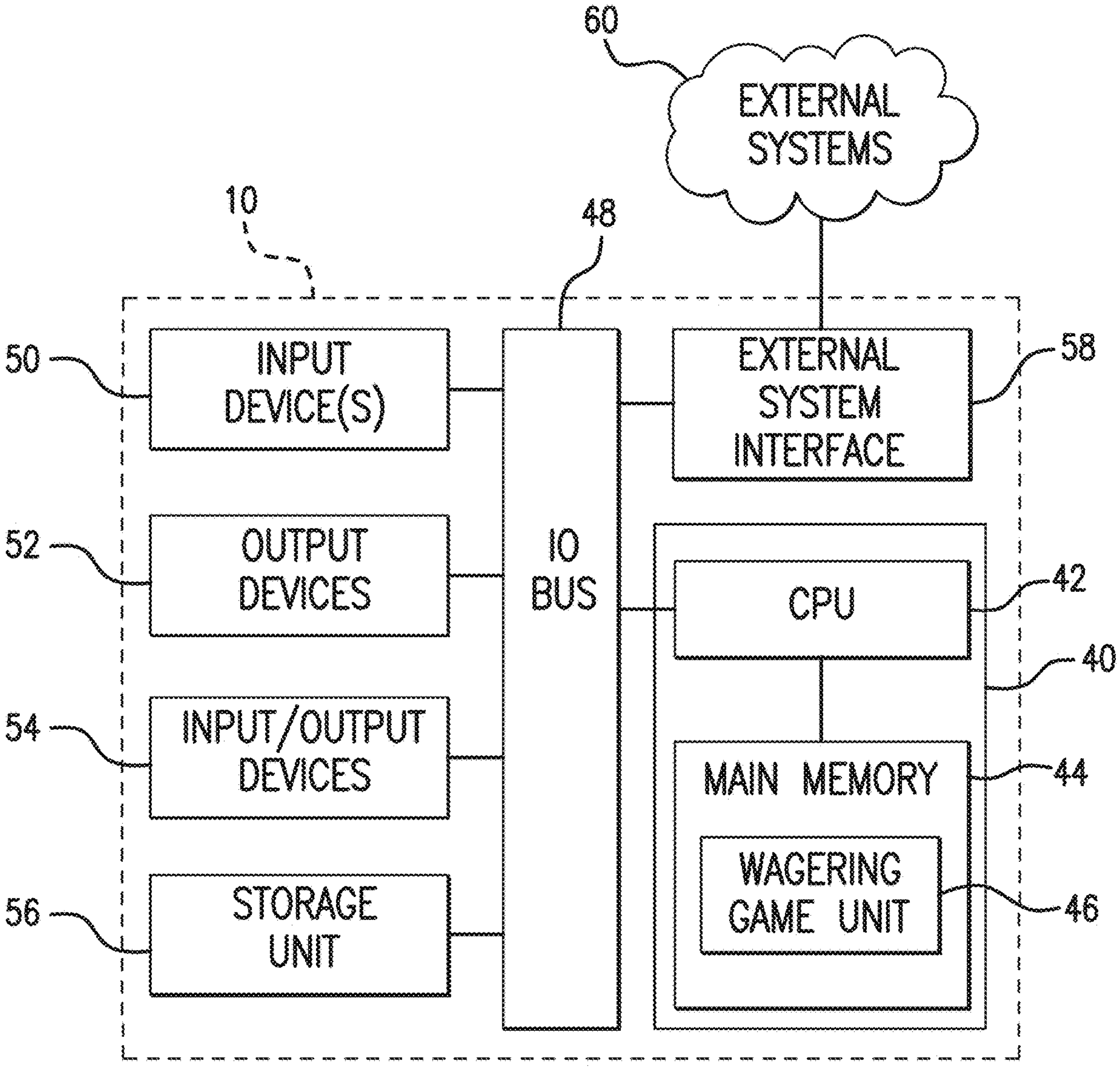
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GL1 Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3:
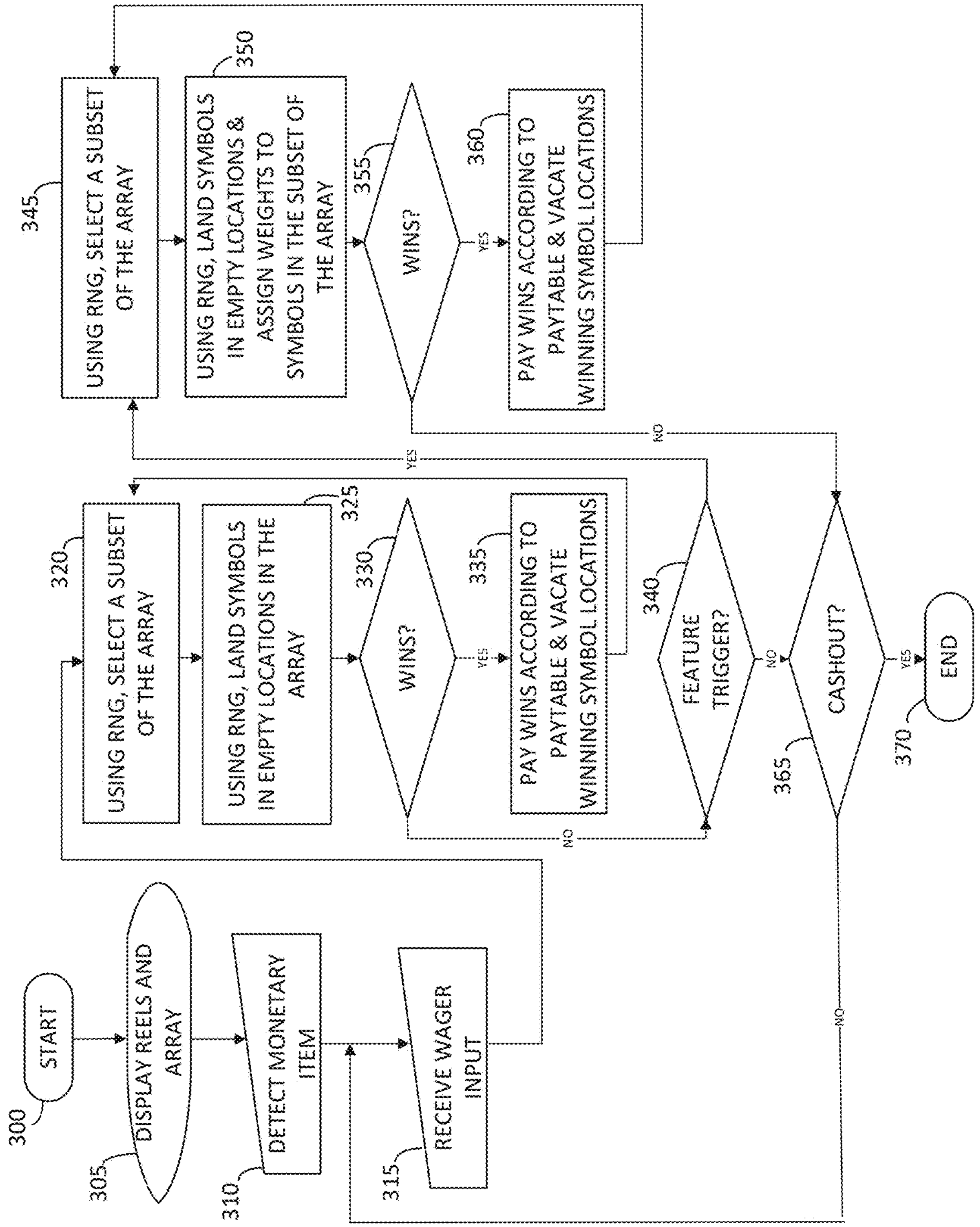
FIG. 3 is a flow diagram for a data processing method that corresponds to instructions executed by a controller, according to an embodiment of the present invention.
Figure 4:
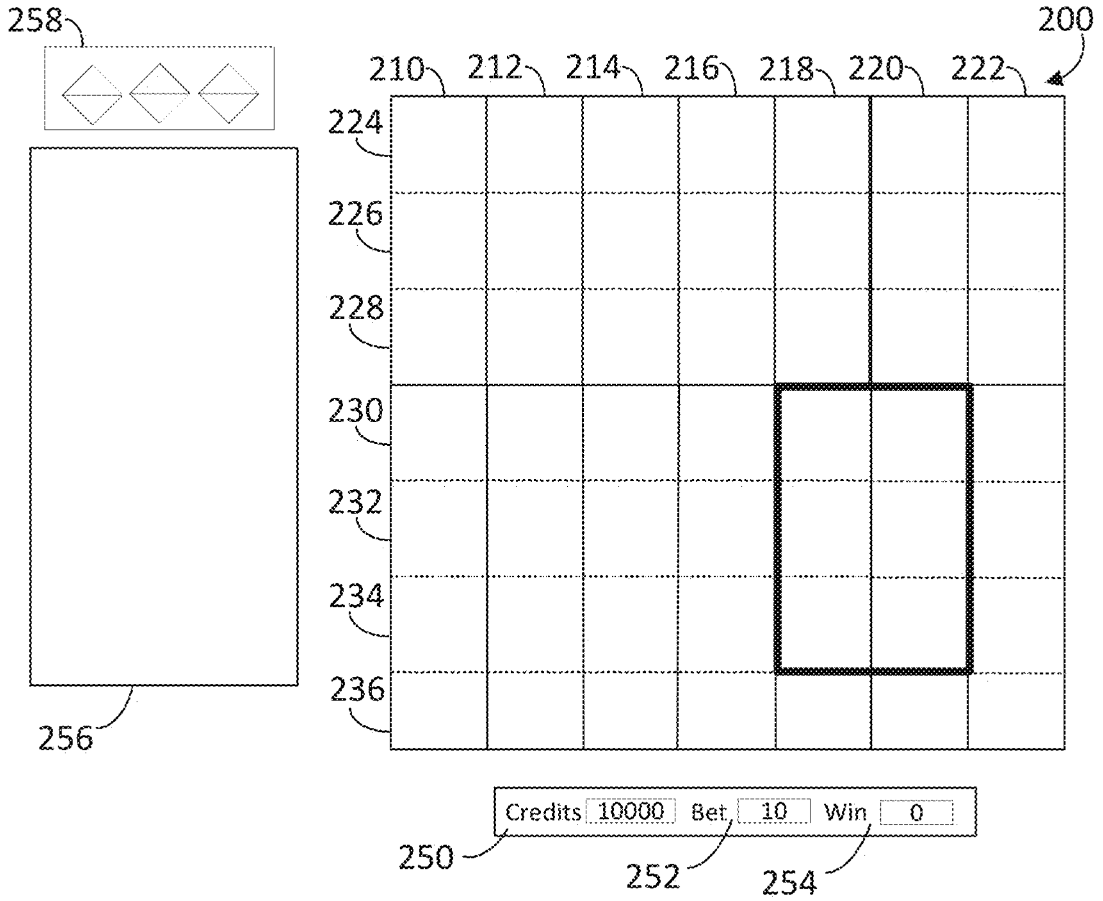
FIGS. 4-22 illustrate examples of game presentations corresponding to various steps presented in FIG. 3.

Referring now to FIG. 3, there is shown a flow diagram representing one data processing method corresponding to at least some instructions stored and executed by the game-logic circuitry 40 in FIG. 2 to perform operations according to an embodiment of the present invention. The data processing method is described below in connection with an exemplary representation of a set of game presentations in FIGS. 4-22.

The data processing method commences at step 300. At step 305, the game-logic circuitry controls one or more presentation devices (e.g., mechanical-reel display device, video display device, or a combination thereof) that presents an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In some embodiments, the reels are associated with respective individual symbol positions of the array such that each reel animates in place and populates only its respective symbol position.

At step 310, the game-logic circuitry detects, via a value input device, a physical item associated with a monetary value that establishes a credit balance. As shown in FIGS. 4-22, the credit balance may be shown on a credit meter 250 of the gaming machine.

At step 315, the game-logic circuitry initiates a wagering game cycle in response to an input indicative of a wager covered by the credit balance. To initiate a spin of the reels, the player may press a "Spin" or "Max Bet" key on a button panel or touch screen. As shown in FIGS. 4-22, the wager may be shown on a bet meter 252.

FIGS. 3-22 illustrate an example of a game in accordance with one or more embodiments. The game includes a base game and at least one free spin bonus game displayed on a 7×7 symbol array with all wins paying as clusters, described below. When player presses spin, using the RNG, a selected subset of the array is selected at step 320. In the examples shown, the subset of the array may be placed at random locations within the array and vary in size from 2×2 to 6×6, though any size up to the full size of the array may be used. For example, in FIG. 4, the currently selected subset of the array is indicated by a 3×2 box spanning rows 230-234 and columns 218-220.

At step 325, the game-logic circuitry spins and stops the reels to randomly land symbols from the reels in the array. The reel spin may be animated on a video display by depicting symbol-bearing strips flashing the various symbols in each of their respective locations. In alternate embodiments, the reel spins may be a "virtual reel spin" performed by the game logic circuitry. When each reel stops, its respective determined symbol may be animated to fall from the top of the display into its assigned location in the array, animated to move horizontally across the display into its assigned location, etc. Any animation of the population of the array with randomly determined symbols falls within the scope of the various embodiments described herein. Upon first initiating a spin, all spaces in the array may be blanked out (FIG. 4) and then filled in (FIG. 5).

Figure 22:
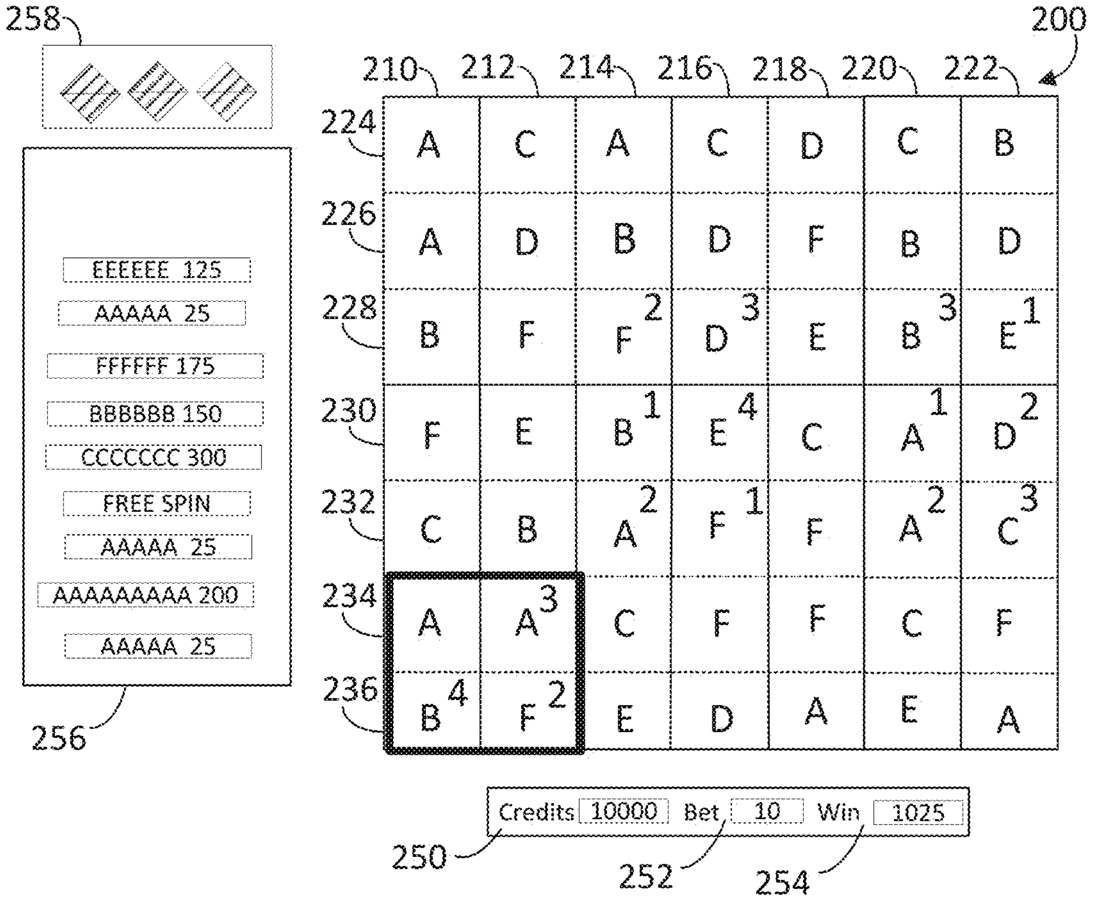
Figure 23:
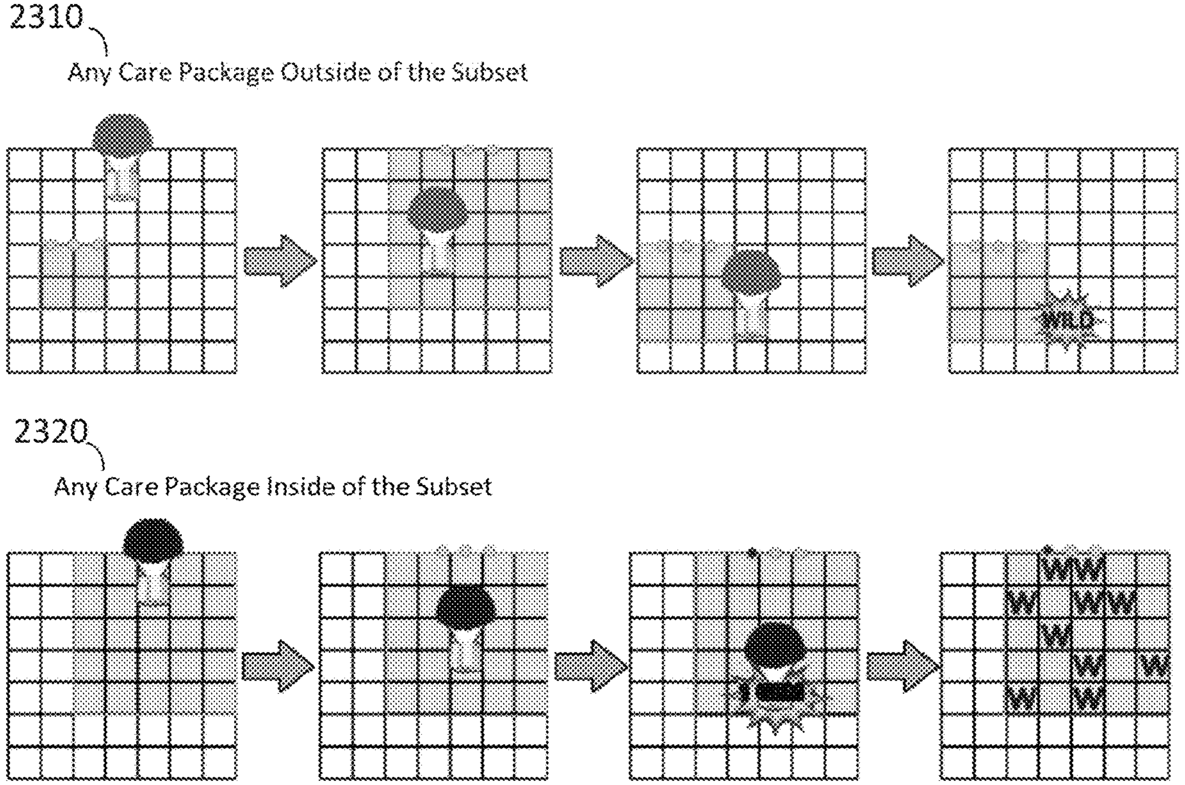
FIG. 23 illustrates two examples of animating a care package falling into an array in accordance with one or more embodiments.

In the illustrated example of FIGS. 4-22, during the spin, a "care package" may also land on the reels. In one example, the care package may be a wrapped package suspended from a parachute that floats down from the top of the display that starts from a point external to the array and then lands in the array. FIG. 23 illustrates two care package scenarios 2310 and 2320. In scenario 2310, if the care package lands outside the currently selected subset of the array, the symbol where the care package lands will turn wild. Alternately, in scenario 2320, if the care package lands inside the selected subset of the array, the symbol at the landing location turns wild and any other symbol inside the subset may also randomly turn wild. In addition, a "gem" is collected in a collection area 258. In the example shown, if three gems are collected during a spin, the player wins a free spin, which will be described below (steps 340-365). Once three gems have been collected, no more gems can be collected. The number of gems required to trigger a free spin may vary. In some embodiments, the gems have different colors and may trigger different types of free spins based on the dominant color of the collected gems. For example, gems may be blue or red. If, at the end of a spin, two red gems were collected, one or more free spins with certain characteristics and rules may be awarded. If at least two red symbols were collected, one or more free spins with other characteristics and rules may be awarded. For the sake of clarity, the illustrated embodiment has only one type of gem and only one type of free spin is awarded. Furthermore, it should be clear that the collection of gems is merely an example of tracking progress toward the triggering of a bonus free spin; a simple counter or other tracking mechanism, displayed or not displayed, may be used. Furthermore, the use of "care packages" are just an example. Other representations of randomly placing one or more modifier symbols into the array once it has been populated may be used. For example, an animated arrow may be fired into the array to land in a position inside or outside of the subset of the array.

Figure 5:
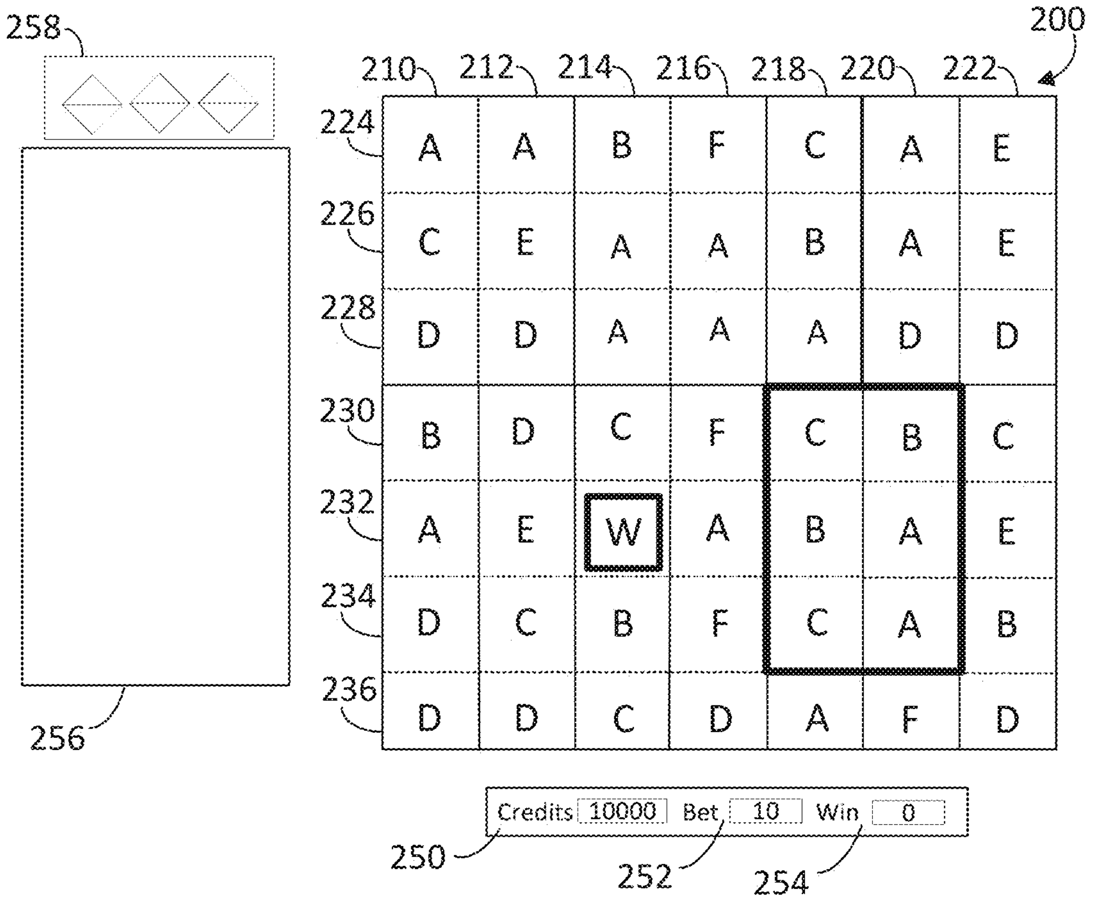

In the example shown in FIG. 5, a care package landed in the position designated by row 232, column 214, as shown by the box around the wild (W) symbol. Because the care package landed outside the selected subset of the array, the symbol where the care package landed simply turned into a wild symbol. No gem was collected. In some embodiments, in addition to symbols A, B, C, D, E and F, the symbol set used in populating the array may also include wild symbols, W. However, to avoid confusion in the illustrations, the illustrated populations of the array have been limited to the symbols A, B, C, D, E and F unless the landing of a care package results in the generation of one or more wild symbols (FIGS. 7-15).

Once the array has been populated, symbols in winning combinations are detected at step 330. In the embodiments described here, a win occurs when 5 or more pay table symbols form a cluster. A cluster is a grouped combination of symbols where every symbol touches at least one other like symbol along a horizontal or vertical edge (diagonals don't count). In some embodiments, diagonally adjacent symbols may be considered adjacent for cluster evaluation purposes. Wild symbols may substitute for all symbols in the array or for a subset of the symbols. For example, wild symbols may substitute for symbols A, B, C, D and E, but not for F symbols. Wild symbols are combined with all adjacent symbols when determining the existence of any winning clusters.

Figure 6:
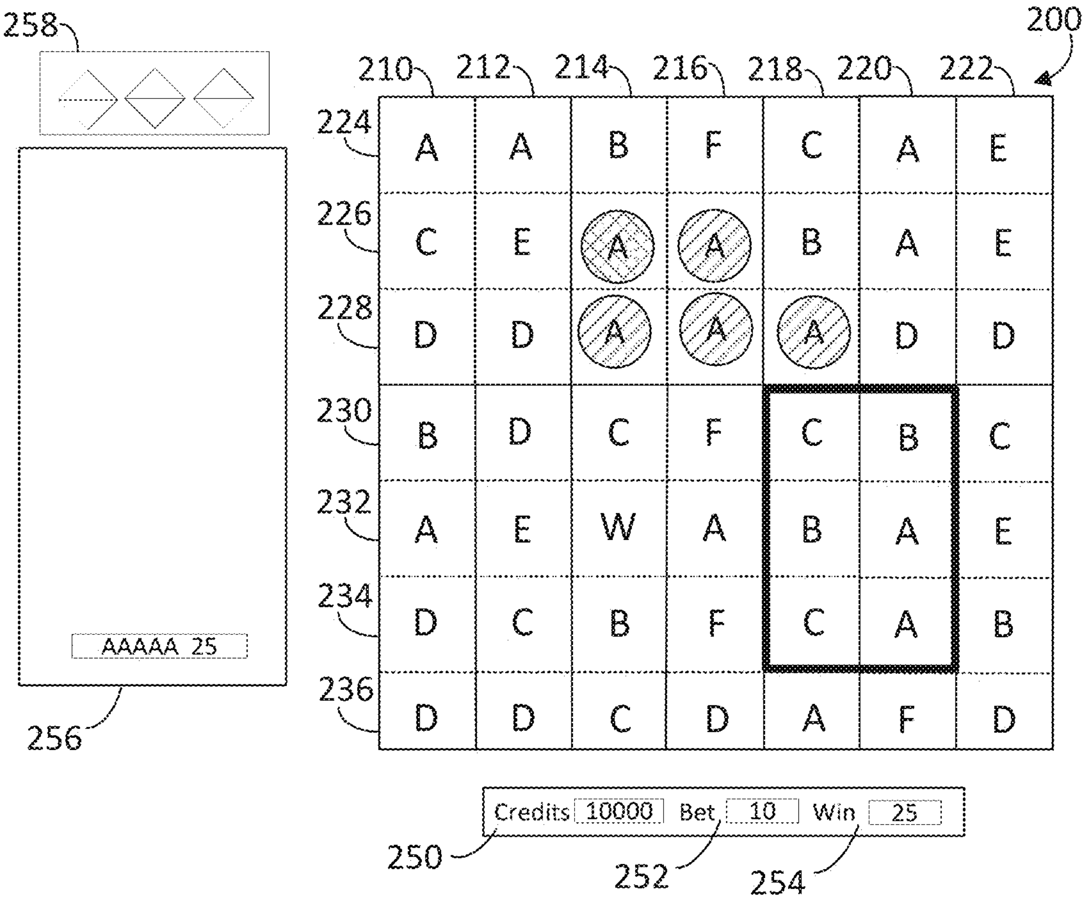
Figure 7:
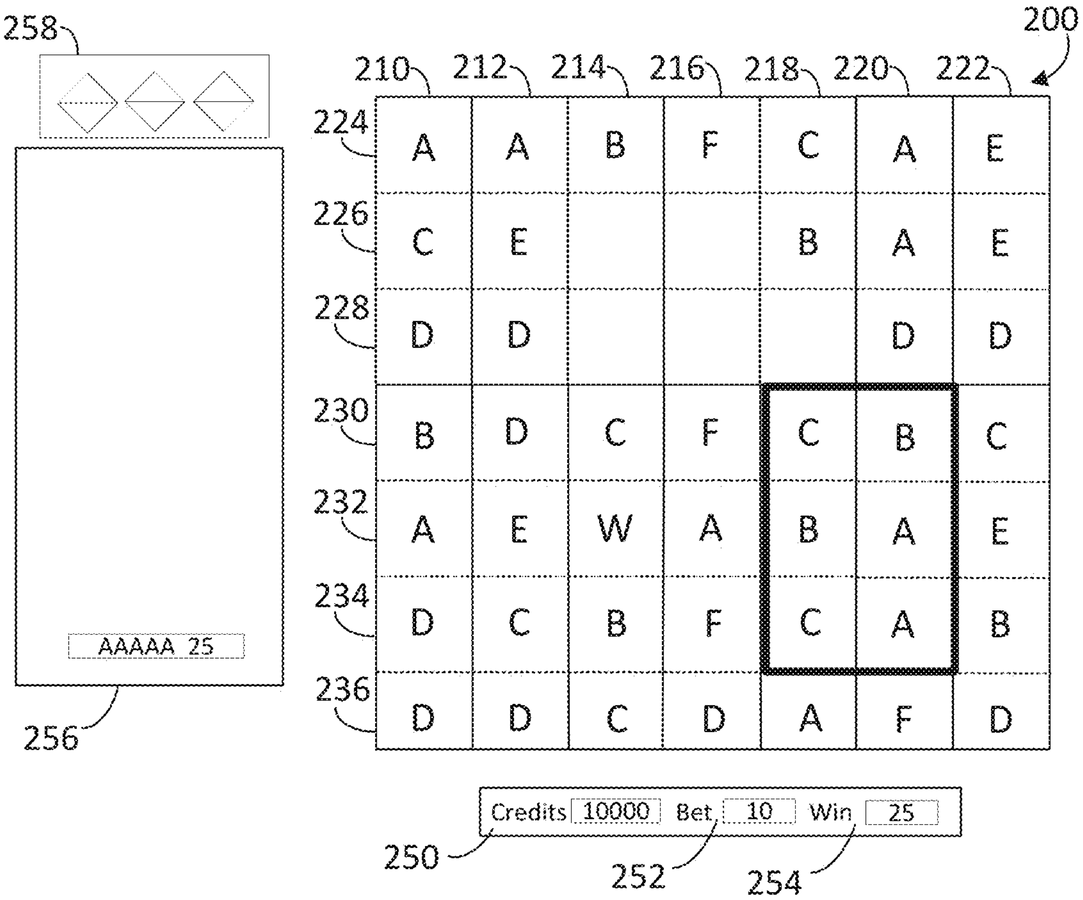
Figure 8:
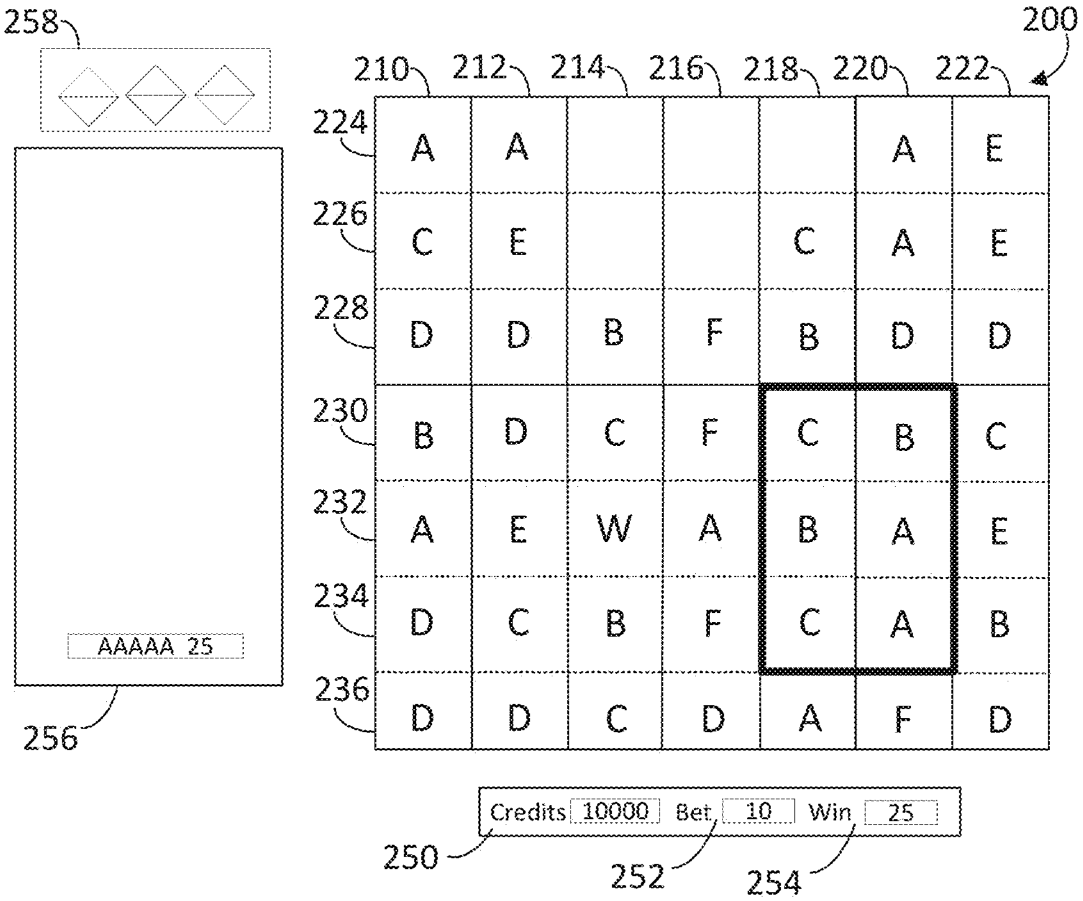

To animate a winning pay, the display may apply a border, pattern, color change, background change, watermark, or other distinguishing characteristic to the winning cluster and/or winning symbols that contributed to the pay. FIG. 6, for example, depicts a cluster pay of five circled A symbols in rows 226 and 228 of the array 200. All awarded pays, in this case, 25 credits, are added to the win meter 254 and the winning combination is also displayed in the information box 256. The game logic circuitry then proceeds to step 335.

Figure 9:
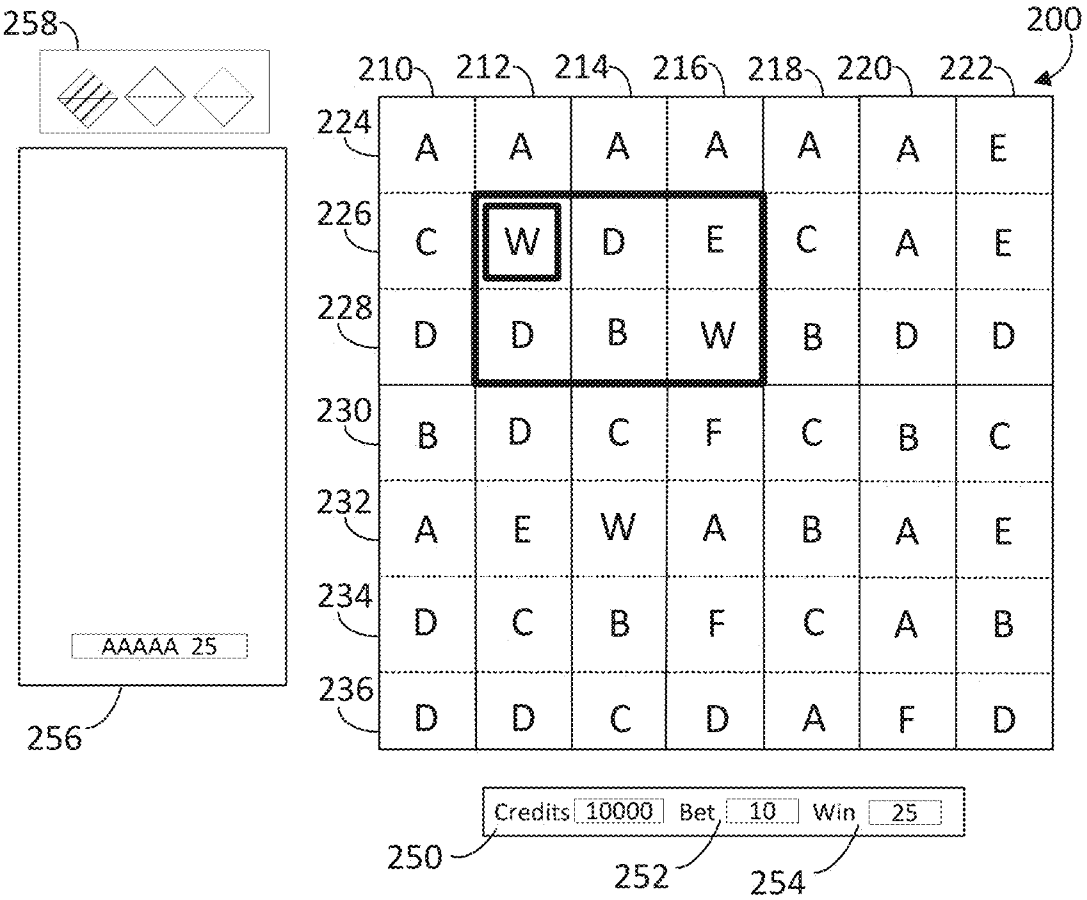
Figure 10:
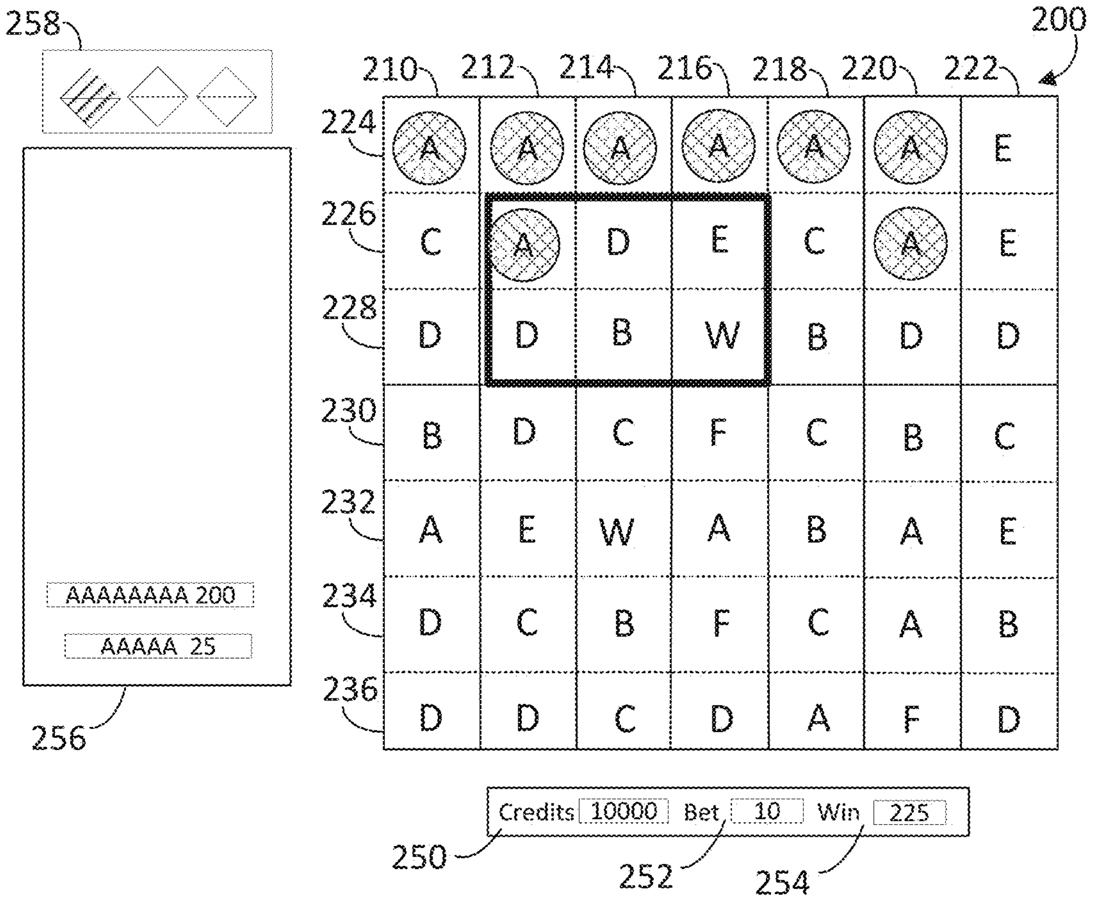

At step 335, the array positions with winning symbols are then vacated (FIG. 7) and all the symbols above those positions cascade (or shift/fall) downward to fill in the vacated positions (FIG. 8) As part of a cascade, the selected subset of the array may move to another position and change size. The game logic circuitry returns to step 320 to determine this new location and size of the subset of the array. At step 325, any blank positions left on top of each column are filled in with new symbols randomly selected by the RNG. As described above, a care package may also land in the array (FIG. 9). In the example of FIG. 9, the care package landed at row 226, column 212, inside the newly sized and placed subset. The symbol at that location has turned wild, as has the symbol at row 228, column 216. Because the care package landed inside the subset of the array, a gem has also been collected in the gem collection area 258.

Figure 11:
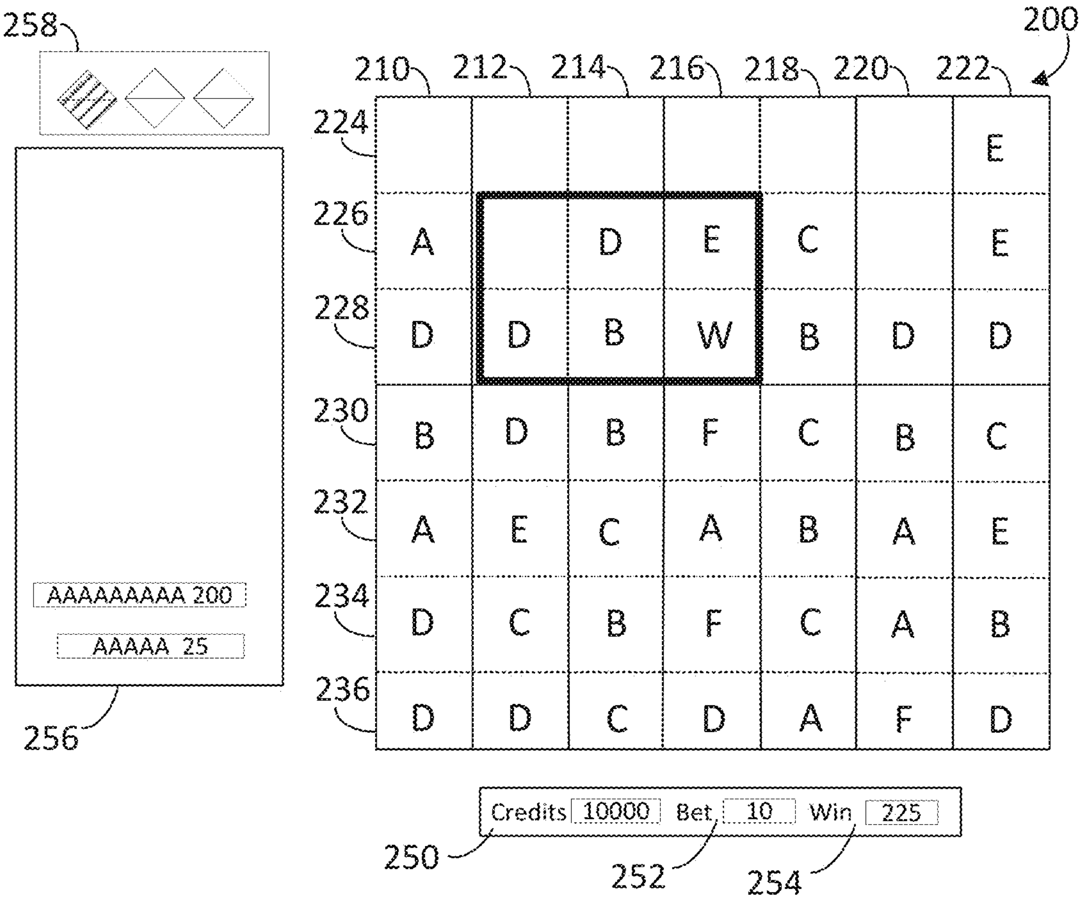
Figure 12:
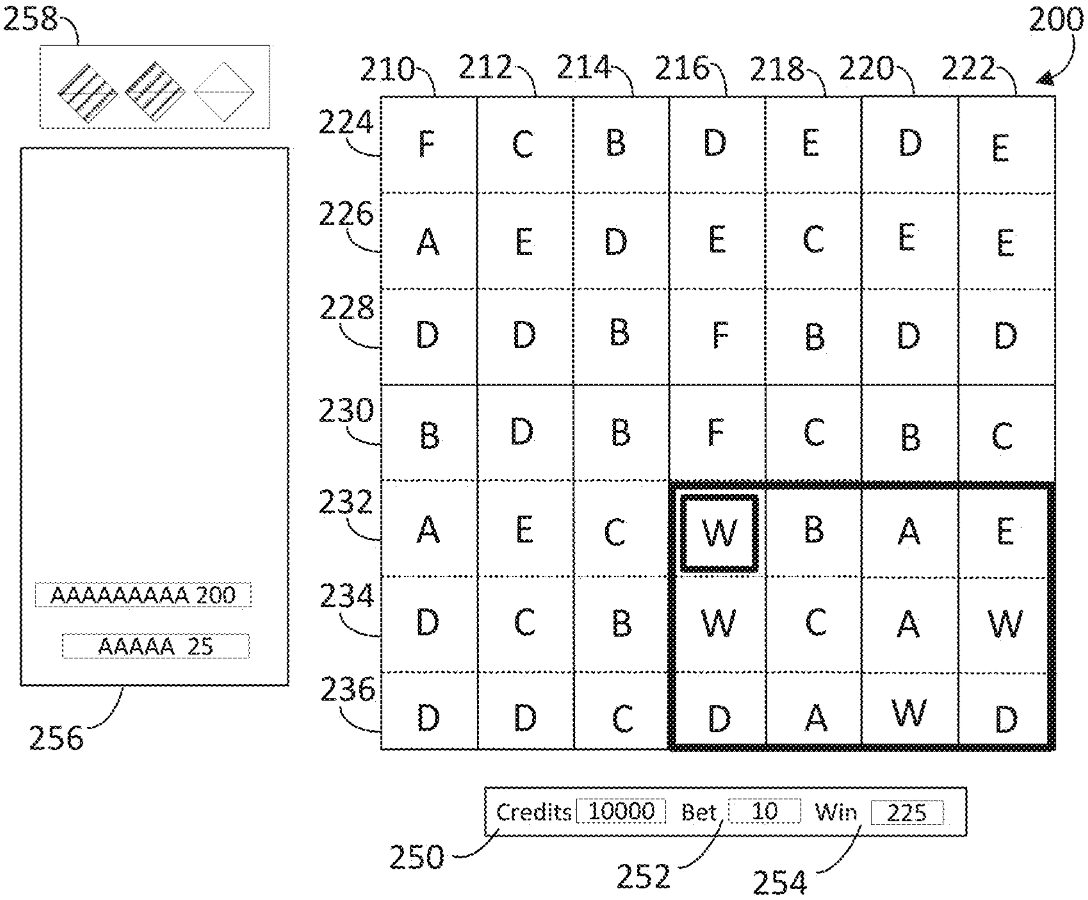
Figure 13:
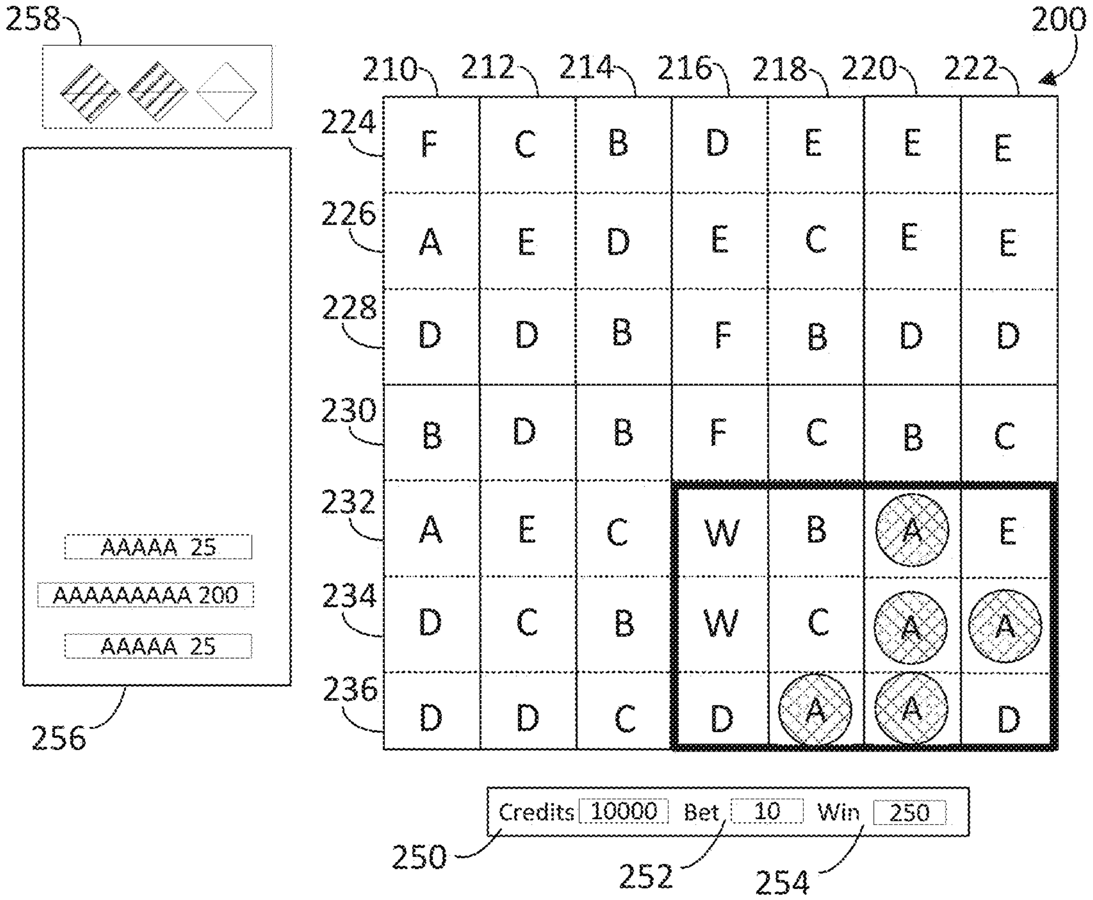
Figure 14:
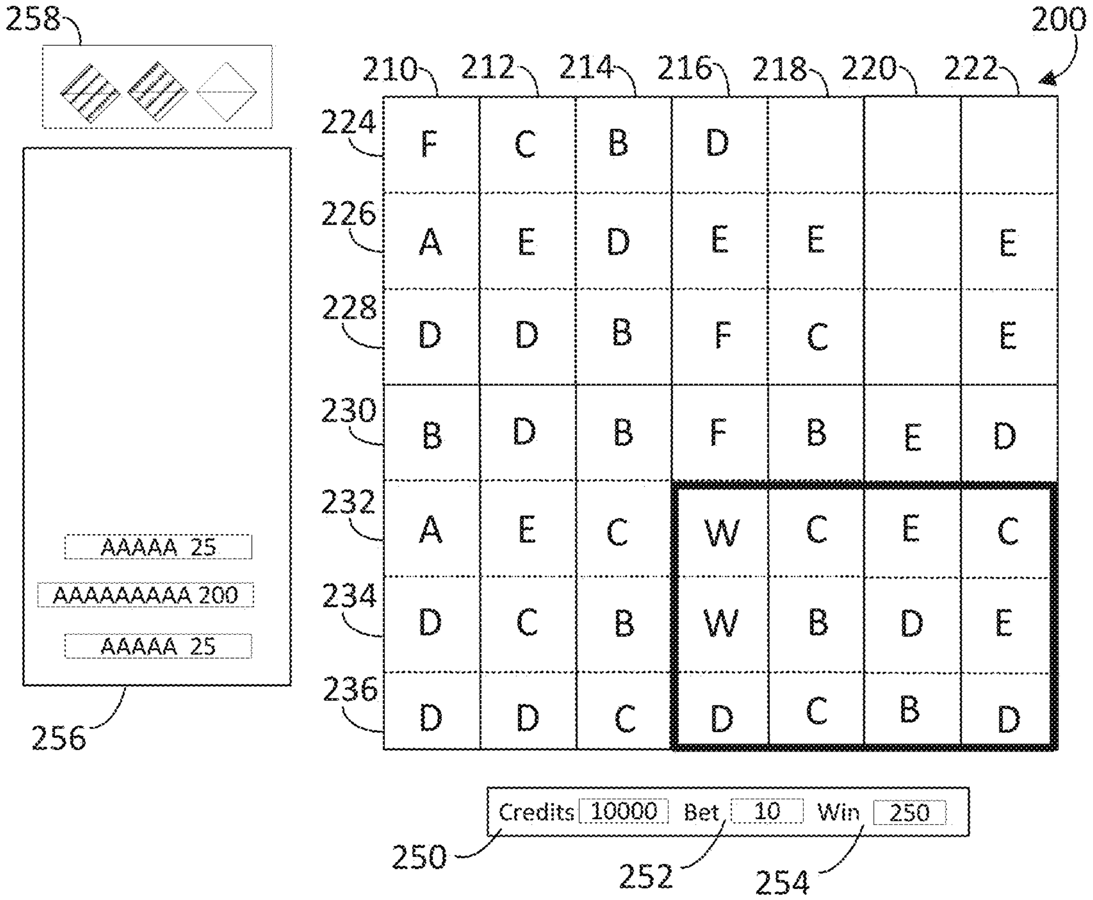

The game logic circuitry determines, at step 335, whether any new winning combinations were created from the cascade at step 330 (FIG. 10), and, if so, it pays and cascades the array again at step 335 (FIG. 11).

Figure 15:
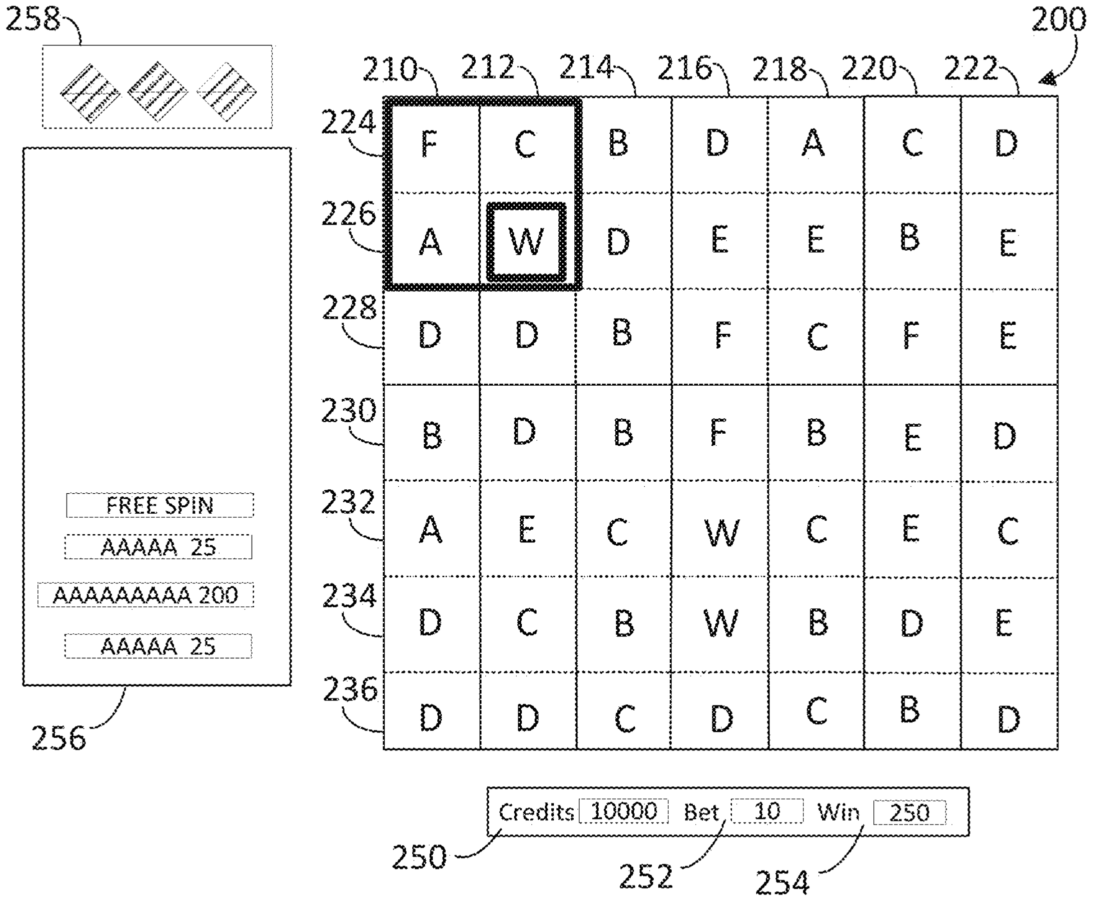

The cascading process between steps 320 and step 335 may repeat until there are no more winning combinations detected at step 330 (FIG. 15). Thus, there may be multiple cascades in a single spin initiated by a wager FIGS. 12-15, described individually below, illustrate several example iterations of cascades. Though a check for a maximum number of cascades is not shown in the example of FIG. 3, in some embodiments, the number of cascades may be limited to a maximum predetermined number, for example, ten cascades.

For additional information regarding cascading spins, the reader is referred to United States Patent Application Publication No. 2004/0033829 A1 ("the '829 Publication"), titled "Symbol Matching Gaming Machine" and filed Aug. 19, 2002, which is incorporated herein by reference in its entirety One exemplary embodiment directed to a cascading spin is described in reference to FIGS. 13-20 of the '829 Publication.

Regardless of how the cascading process ends, when the cascading is complete, the game logic circuitry proceeds to step 340, where it is determined whether the awarding of a free spin has been triggered. If not, the spin is considered complete and the game logic circuitry checks to see whether the player indicates that no further play is desired via a cashout input at step 370. If no cashout is desired, a new spin is initiated with the acceptance of a new wager at step 315 and the above-described process of steps 315-365 repeats until a cashout input is received at step 365, at which time the method ends at step 370.

If, however, awarding of a free spin has been triggered at step 340, an additional series of steps (345-360) are carried out. In the examples, the collection of three gems during the spin (and its resulting cascades) trigger the awarding of a free spin. It should be clear that, in other embodiments, the game-logic circuitry may employ other means to determine a triggering event for the free spin. For example, without limitation, the triggering event may be based on a random determination using the RNG, when one or more scattered symbols appear in the array, if more than a certain number of winning clusters have occurred during the spin, after a certain number of losing base game spins have occurred, etc. Once triggered, the awarding of the free spin may be indicated in the information box 256.

The illustrated method describes a base game and a free spin bonus game triggered during play of the underlying base game. In one or more alternate embodiments, the concepts of weighting symbols within a subset of an array may apply to a base game, a bonus game, or both. The base or bonus game may be one or more free spins (and any resulting cascades) utilizing steps 345 through 360 of the method in FIG. 3. In the illustrated embodiment, when the free spin game commences, a single spin is awarded, however, the number of free spins may be any fixed or variable number. As described below, if any wins occur on the initial free spin, the wins are paid and the array is cascaded, the subset of the array is randomly repositioned and sized, and weights are added to one or more symbols in the new subset of the array. Any newly resulting wins are paid, and the process repeats until no wins occur, at which point the free spin game ends and the method returns to the base game.

Figure 16:
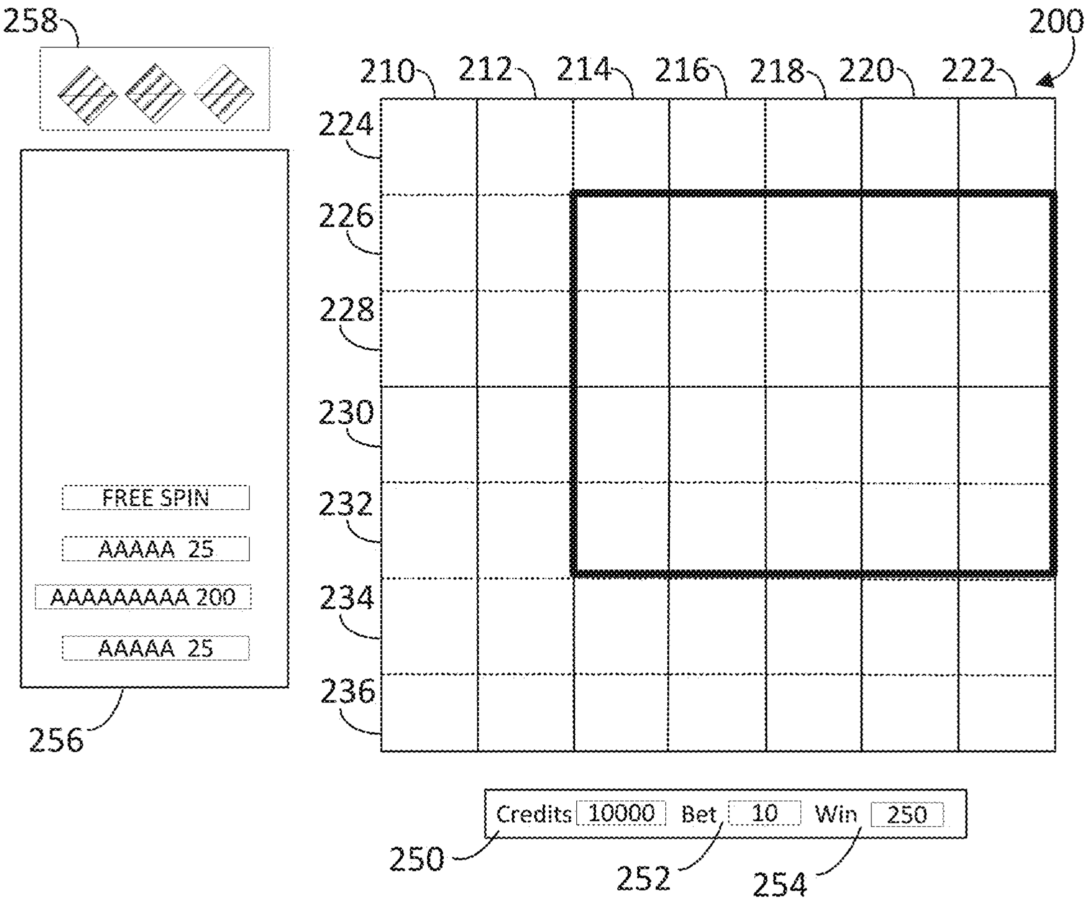
Figure 17:
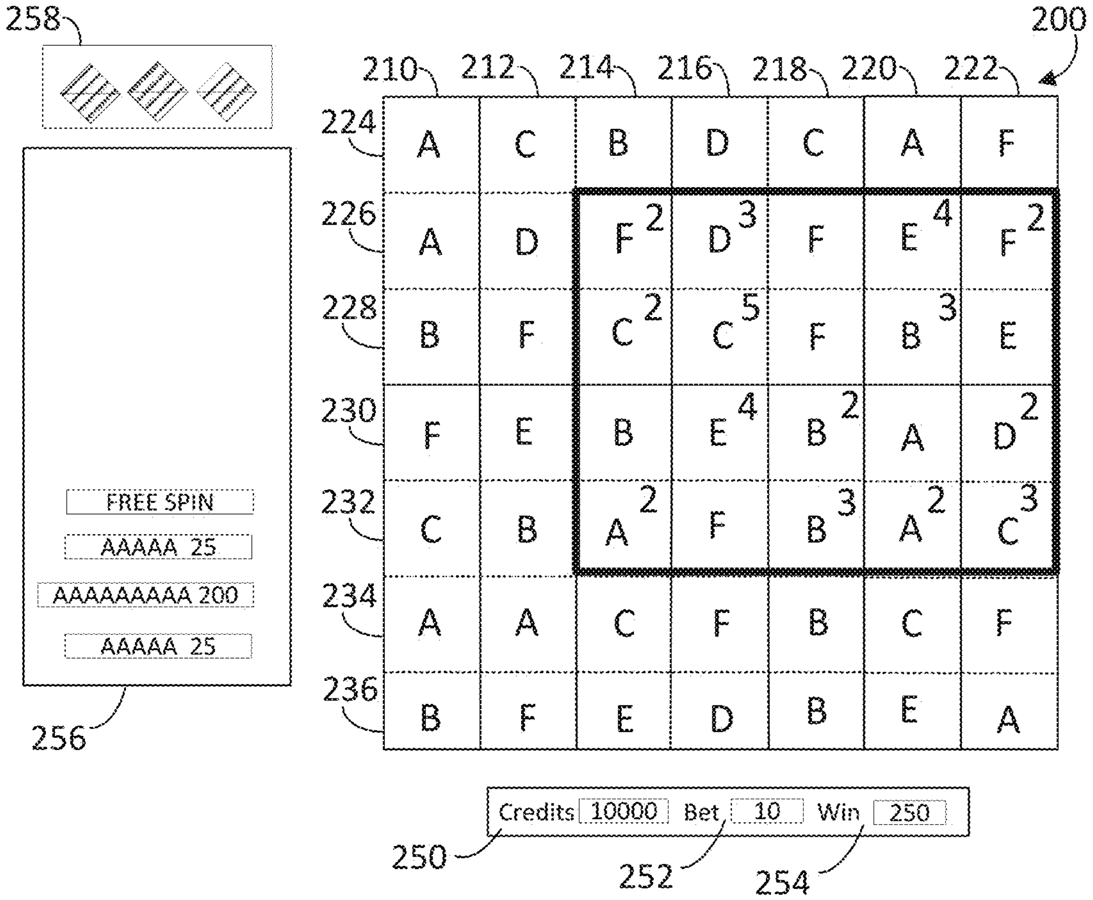

At step 345, as in step 320, using the RNG, the game logic circuitry selects a subset of the array (FIG. 16). If this is an initial population of the array (not a cascade), the array may be blanked out so that all positions are freshly populated at step 350, wherein the game-logic circuitry spins and stops the reels to randomly land symbols from the reels in the blank positions of the array (FIG. 17). Also at step 345, each symbol in the subset of the array receives a randomly assigned weight, which may be designated by a number. This number is shown as a superscript in FIGS. 17-22, however the number may be otherwise displayed adjacent to, or superimposed on, the symbol. In some embodiments, a weighted symbol may be graphically represented as a stack of that symbol at its location in the array, the depth of the stack corresponding to the symbol's assigned weight. A symbol with an assigned weight of one may or may not be displayed with any weight designation. In some embodiments, all assigned weights may be greater than one.

Figure 18:
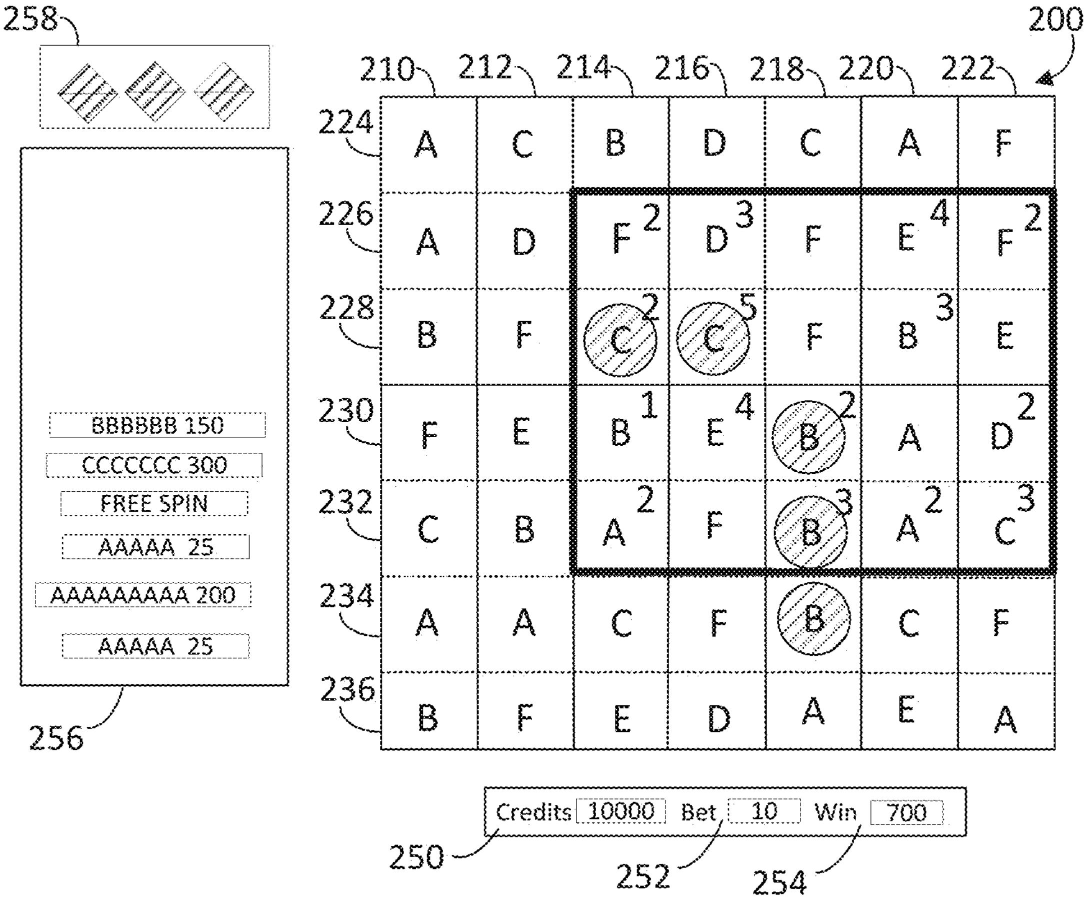
Figure 19:
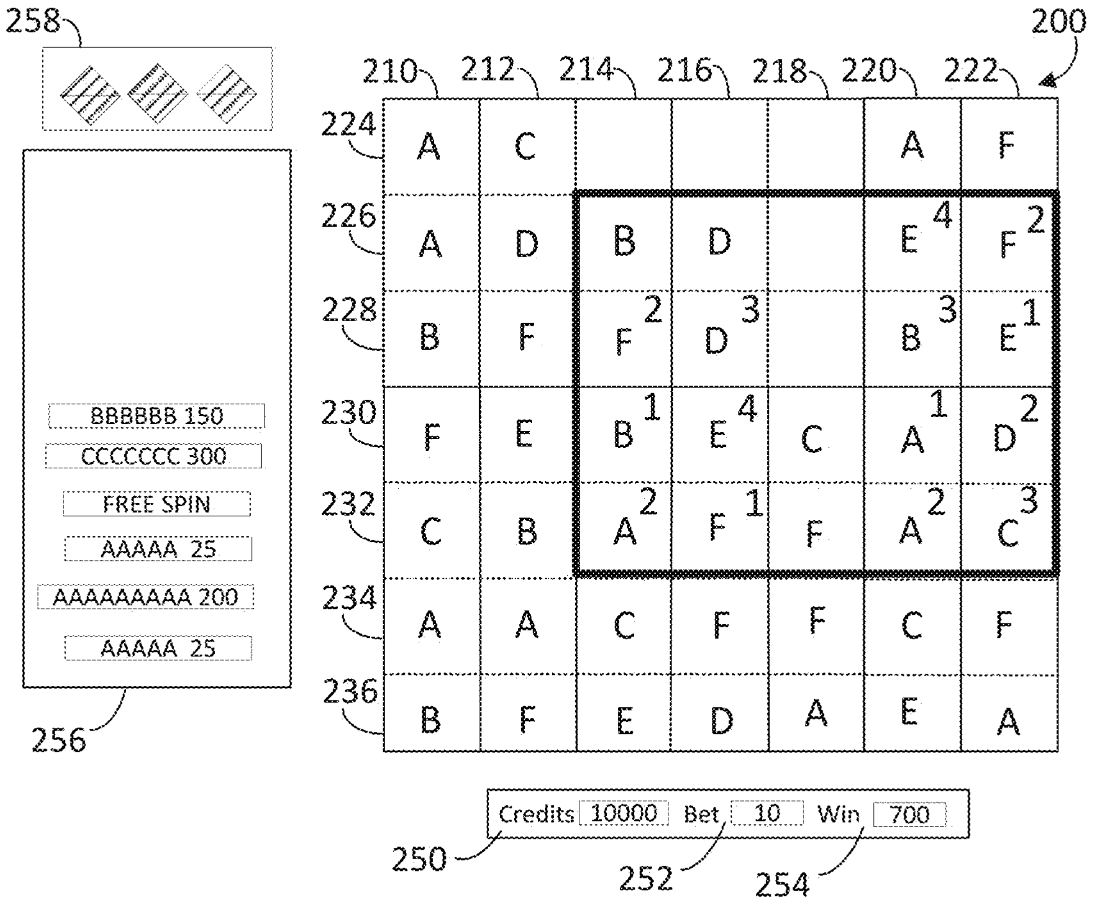

The symbol weights are used for cluster win evaluation purposes at step 355. For example, a symbol with a "2" displayed on it will contribute two symbols to the evaluation of a winning cluster. In FIG. 18, for example, two adjacent C symbols with combined weights of seven (2 and 5) appear in the subset of the array. The weights of the symbols in the combination are summed and this combination is evaluated as a cluster of seven C symbols. Similarly, three adjacent B symbols appear in column 218. Their combined weights (2, 3 and 1) total six, thus, this cluster is evaluated as a cluster of six B symbols, even though the cluster only occupies three symbol positions. All awarded pays, in this case, 150 and 300 credits, are paid, added to the win meter 254 and displayed in the information box 256 at step 360.

Figure 20:
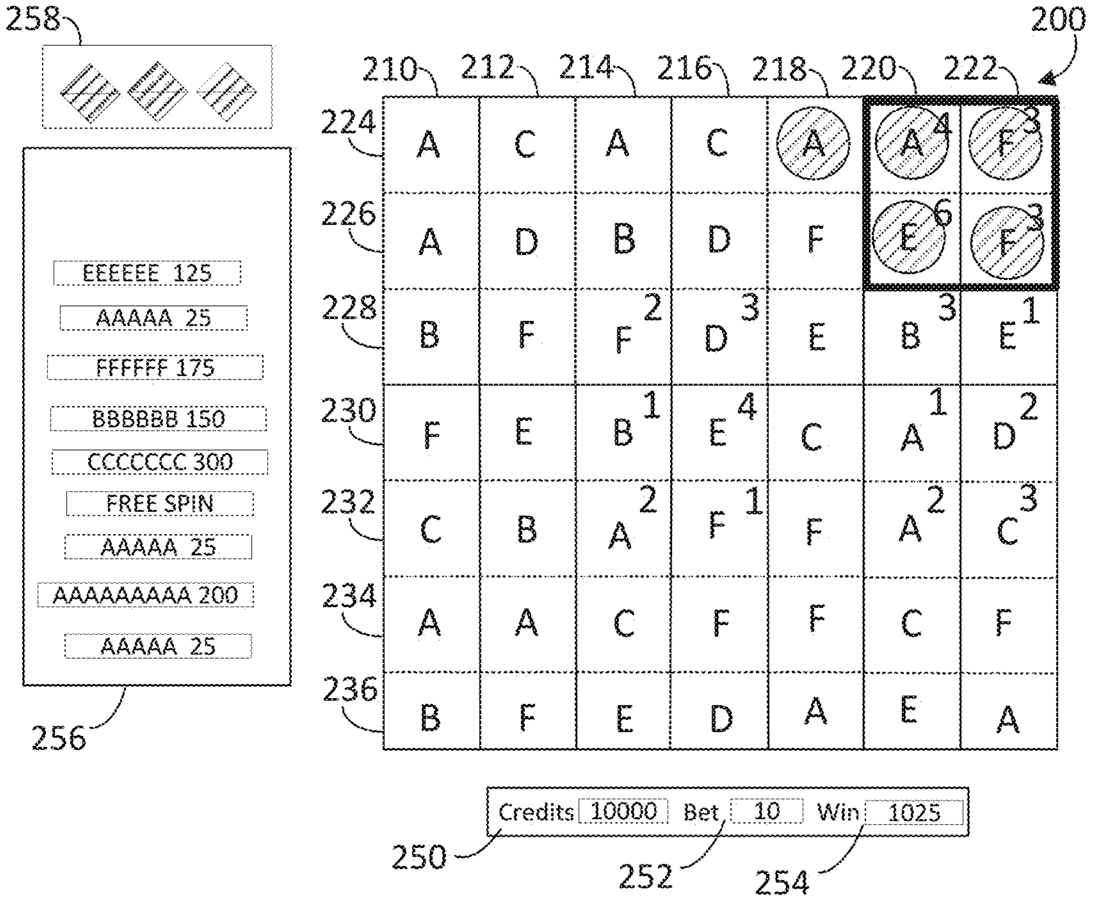

At step 360, as in step 335, the array positions with winning symbols are then vacated (FIG. 19) and all the symbols above those positions cascade (or shift/fall) downward to fill in the vacated positions. The game logic circuitry returns to step 345 to determine a new location and size of the subset of the array. As shown in FIG. 20, in the free spin cascades, it should be noted that weights previously assigned to symbols in the array persist when the subset is repositioned and, should the new subset overlay any previously weighted symbols, new weights may be added to the previous weights. An example of this may be seen at row 226, column 220, where the E symbol has had an additional weight of two added to its previous weight of 4 (FIGS. 17-19) for a new weight of 6.

In some embodiments, rather than adding new weights to symbols, completely new random weights may be assigned to the symbols in the current subset of the array. In still other embodiments, while weights previously assigned to symbols in the array are persistent, their weights may change with each cascade. For example, with each cascade, each symbol weight may be reduced such that the duration of a weight's persistence is dependent on its original value, subject, or course, to any further modification of the weight from the symbol appearing in a subsequent active subset of the array.

Following step 360, the game logic circuitry determines a new active subset of the array at step 345 and any blank positions left on top of each column in step 360 are then filled in with new symbols randomly selected by the RNG at step 350.

Figure 21:
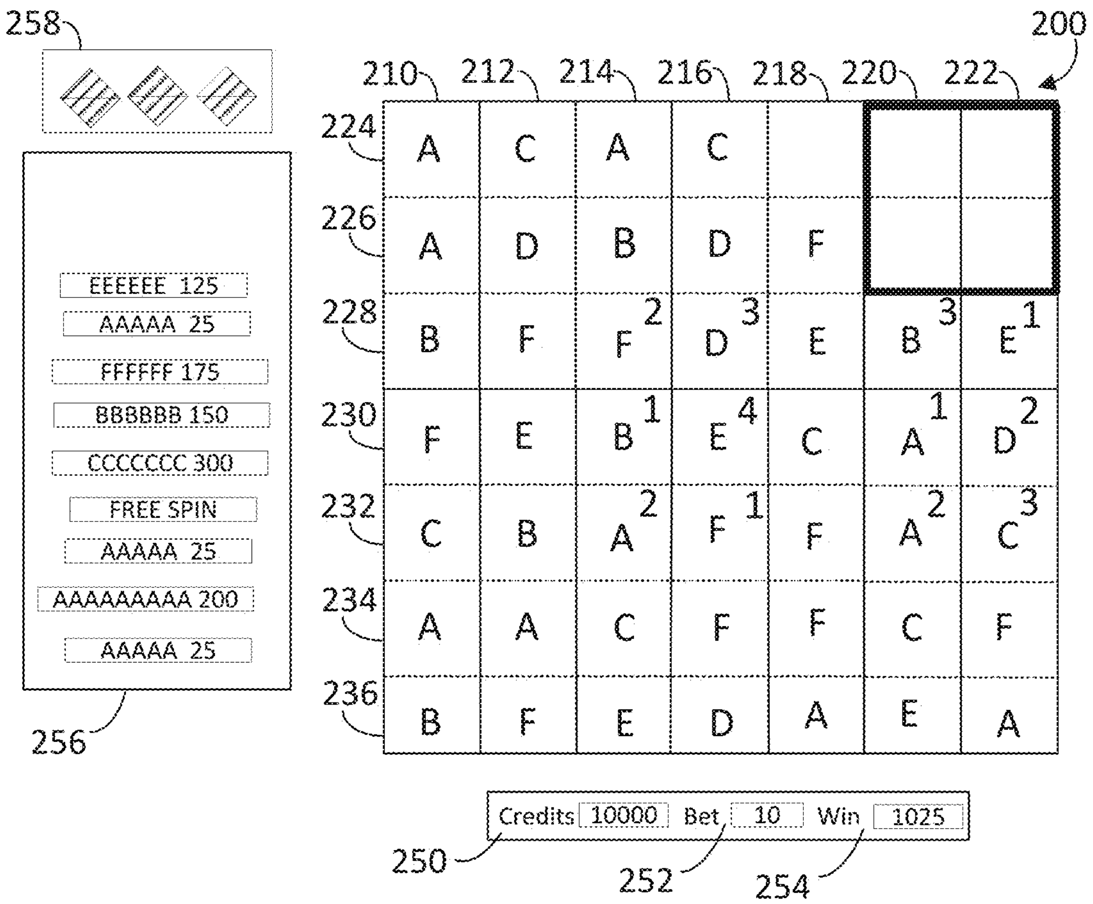

The game logic circuitry determines, at step 355, whether any new winning combinations were created from the cascade occurring as the result of step 360, the newly assigned weights of step 345 and the newly placed symbols of step 350. (FIG. 20). If new winning combinations are found, it pays and vacates the array again at step 335 (FIGS. 20, 21). As illustrated in FIGS. 16-22, described individually below, the cascading process between steps 345 and step 360 may repeat until there are no more winning combinations detected at step 355 (FIG. 22). Thus, there may be multiple cascades in a single free spin. Though not shown in the example of FIG. 3, in some embodiments, the number of free spin cascades may be limited to a maximum predetermined number, for example, ten cascades. Regardless of how the cascading process ends, when the cascading is complete, the game logic circuitry proceeds to step 365, where, as above, the game logic circuitry checks to see whether the player indicates that no further play is desired via a cashout input at step 365. If no cashout is desired, a new spin is initiated with the acceptance of a new wager at step 315. If a cashout input is received at step 365, the method ends at step 370.

While the example embodiments described above are discussed within the context of a game or games employing cluster pays and a cascading array, other embodiments of a randomly positioned and sized active subset of a reel array in which symbol weights are randomly assigned fall within the scope of the invention. Once weights have been applied to symbols within the active subset of the array, assigned symbol weights may be considered in determining winning combinations other than, or in combination with, cluster pays.

In a game employing line pays instead of cluster pays, for example, any line pays passing through a weighted symbol's position may count as multiple winning lines passing through that position. For example, a winning combination passing through a symbol assigned a weight of three will be awarded for three copies of that winning pay line. Alternately, a winning combination passing through a symbol with a weight of three may simply add that symbol sequentially into the pay line three times. For example, a pay line bearing the symbols A-A3-B-E-F would award a line pay for AAAA. In some embodiments, a combination of line pays and cluster pays may be employed. While line pays may be the primary method for awarding wins, additional cluster pays may be awarded for symbols falling inside the current active subset of the array. The use of weights allows a relatively small number of symbols to create a larger cluster than would normally be available.

In a game that employs "ways pays," in which like symbols in winning combinations appear on adjacent reels without the requirement to be on a specified pay line or directly adjacent to one another, weighted symbols are replicated to add more copies of the symbol to the reel on which they reside, thus temporarily increasing the number of ways a winning combination with that symbol are possible. This replication may be animated in the display or simply applied virtually when evaluating winning combinations. Alternately, as with the combination of line and cluster pays described above, the game may fundamentally employ ways pays, but additional cluster pays may be awarded for symbols falling inside the active subset of the array.

In a game requiring a predetermined number of a particular symbol to trigger a feature, symbol weights may be considered in determining the existence of the triggering condition. For example, if three A symbols on the first two reels are required to trigger a bonus spin, a single A on the leftmost reel may be combined with a single A with an assigned weight of two on the second reel to satisfy the triggering condition. Similarly, if a game with value-bearing (WYSIWYG or "what you see is what you get") symbols requires the appearance of one or more "catalyst" symbols to award the values on the value-bearing symbols, the values may be enhanced by any weights assigned to the catalyst symbols or assigned to the WYSIWYG symbols. As an example, awarding unweighted $10 and $5 coins based on a catalyst symbol assigned a weight of three would pay a total of $45 ($30+$15). Alternately, or in combination, WYSIWYG awards may be replicated according to the weight assigned to each WYSIWYG symbol. For example, awarding of an unweighted $10 coin and a $5 coin assigned a weight of two would pay a total of $20 ($10+$5+$5).

While the embodiments described above provide various examples of the persistence of the weights assigned to symbols such as persisting after the active subset no longer contains the weighted symbols, the addition of more weight to a symbol when it falls within the active subset a subsequent time, and so forth, decrementing the weight of one or more symbols from cascade to cascade to limit their persistence, etc., and other schemes for persisting the weights assigned to symbols identified as being within the active matrix fall within the scope of the invention.

Furthermore, while the above embodiments describe an active subset of the array that is relocated and possibly resized between spins or cascades, the size and the location of the subset may persist for a certain number of spins (or cascades) before being relocated or resized. In some embodiments, the size of the active subset may not change randomly. For example, the size may gradually increase as spins and/or cascades progress until a maximum size is reached or until the spin/cascade series ends. In other embodiments, the size of the active subset may gradually shrink until a minimum size is reached, until the spin/cascade series ends, or until the active subset is not assigned at all. In some embodiments, the appearance (or not) of an active subset may be randomly determined, determined by some triggering condition internal or external to the game, etc.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:
- presenting, by a presentation assembly, a plurality of reels and an array, the plurality of reels bearing a plurality of symbols; and
- conducting, by game-logic circuitry, a spin of the plurality of reels, the spin including:
  - randomly selecting an active subset of the array according to one or more first outputs of a continuously cycling random number generator;
  - spinning and stopping the plurality of reels to land symbols from the plurality of symbols in the array;
  - randomly, according to one or more second outputs of the continuously cycling random number generator, assigning a weight to one or more of the landed symbols within the active subset of the array;
  - awarding an award for a winning cluster in the array, wherein the winning cluster comprises at least a predetermined number of adjacent like symbols, and the award is based at least in part on a count of occurrences of landed adjacent like symbols and a total value of their respective weights;
  - removing the symbols in the winning cluster from the array and replacing the removed symbols with replacement symbols from the plurality of symbols;
  - randomly reselecting a new active subset of the array according to one or more third outputs of the continuously cycling random number generator; and
  - repeating the assigning, awarding, removing and reselecting steps until no winning cluster of symbols occurs.

2. The method of claim 1, wherein removing the symbols of the winning cluster from the array and replacing the removed symbols with replacement symbols from the plurality of symbols comprises cascading symbols in the array.

3. The method of claim 1, wherein the weights assigned to the symbols are indicated by a numeric representation of the weights on or adjacent to the respective symbols.

4. The method of claim 1, wherein symbols that have been assigned a weight are graphically represented by a stack of symbols n deep, where n is the assigned weight.

5. The method of claim 1, wherein the weights assigned to the symbols persist after the new active subset of the array is selected.

6. The method of claim 5, wherein weights assigned to symbols within the new active subset of the array are added to any previous weights assigned to the symbols within the new active subset of the array.

7. The method of claim 1, further comprising:
- receiving, via at least one of one or more electronic input devices, an input that initiates a spin.

8. The method of claim 1, wherein the spin comprises a free spin awarded upon a triggering event.

9. The method of claim 1, further comprising displaying, via the presentation assembly, a representation of each winning cluster and its respective award in an information box.

10. A method of operating a gaming machine, the method comprising the operations of:
- presenting, by a presentation assembly, a plurality of reels and an array, the plurality of reels bearing a plurality of symbols; and
- conducting, by game-logic circuitry, a spin of the plurality of reels, the spin including:
  - randomly selecting an active subset of the array according to one or more first outputs of a continuously cycling random number generator;
  - spinning and stopping the plurality of reels to land symbols from the plurality of symbols in the array;
  - randomly assigning, according to one or more second outputs of the continuously cycling random number generator, a weight to one or more of the landed symbols within the active subset of the array; and
  - awarding an award for a winning combination in the array, wherein the winning combination comprises at least a predetermined number of like symbols, and the award is based at least in part on a sum of a count of occurrences of landed like symbols and a total value of their respective weights.

11. The method of claim 10, wherein the weights assigned to the symbols are indicated by a numeric representation of the weights on or adjacent to the respective symbols.

12. The method of claim 10, wherein symbols that have been assigned a weight are graphically represented by a stack of symbols n deep, where n is the assigned weight.

13. The method of claim 10, further comprising:
- receiving, via at least one of one or more electronic input devices, an input that initiates a spin.

14. The method of claim 10, further comprising displaying, via the presentation assembly, a representation of each winning combination and its respective award in an information box.

15. The method of claim 10, wherein the winning combination comprises at least one value-bearing symbol and wherein the value borne by the value-bearing symbol is based on a weight assigned to one of the symbols in the array.

16. A gaming system comprising:
- a gaming machine including a presentation assembly configured to present a plurality of reels and an array, the plurality of reels bearing a plurality of symbols; and
- game-logic circuitry configured to perform the operations of:
- presenting, by a presentation assembly, a plurality of reels and an array, the plurality of reels bearing a plurality of symbols; and
- conducting, by game-logic circuitry, a spin of the plurality of reels, the spin including:
  - randomly selecting an active subset of the array according to one or more first outputs of a continuously cycling random number generator;
  - spinning and stopping the plurality of reels to land symbols from the plurality of symbols in the array;

randomly, according to one or more second outputs of the continuously cycling random number generator, assigning a weight to one or more of the landed symbols within the active subset of the array;

awarding an award for a winning cluster in the array, wherein the winning cluster comprises at least a predetermined number of adjacent like symbols, and the award is based at least in part on a count of occurrences of landed adjacent like symbols and a total value of their respective weights;

removing the symbols in the winning cluster from the array and replacing the removed symbols with replacement symbols from the plurality of symbols;

randomly reselecting a new active subset of the array according to one or more third outputs of the continuously cycling random number generator; and repeating the assigning, awarding, removing and reselecting steps until no winning cluster of symbols occurs.

17. The system of claim 16, wherein removing the symbols of the winning cluster from the array and replacing the removed symbols with replacement symbols from the plurality of symbols comprises cascading symbols in the array.

18. The system of claim 16, wherein the weights assigned to the symbols are indicated by a numeric representation of the weights on or adjacent to the respective symbols.

* * * * *